United States Patent [19]

Nakai et al.

[11] 4,094,942
[45] June 13, 1978

[54] METHOD FOR REMOVING UNREACTED MONOMER

[75] Inventors: Setsuo Nakai; Hiroshi Ochi, both of Niihama, Japan

[73] Assignees: Sumitomo Chemical Company, Limited, Osaka; The Japan Steel Works, Ltd., Tokyo, both of Japan

[21] Appl. No.: 650,440

[22] Filed: Jan. 19, 1976

[51] Int. Cl.$^2$ ............................................. B29F 3/03
[52] U.S. Cl. .................................. 264/102; 159/2 E; 264/141; 425/204; 526/68; 526/71
[58] Field of Search ................. 264/101, 102, 83, 141, 264/142, 143, 176 R, 349; 159/2 E, 49; 425/131.1, 204, 382; 526/68, 71

[56] References Cited

U.S. PATENT DOCUMENTS

| | | | |
|---|---|---|---|
| 3,117,953 | 1/1964 | Goebel et al. | 260/95 R |
| 3,146,493 | 9/1964 | Steinle et al. | 264/349 |
| 3,207,205 | 9/1965 | Briskin et al. | 264/101 |
| 3,255,171 | 6/1966 | Eilbracht et al. | 526/68 |
| 3,267,075 | 8/1966 | Schnell | 264/102 |
| 3,352,952 | 11/1967 | Marr | 264/176 R |
| 3,409,937 | 11/1968 | Klosek et al. | 425/204 |
| 3,812,897 | 5/1974 | Latinen | 159/49 |
| 3,917,507 | 11/1975 | Skidmore | 159/2 E |

Primary Examiner—Jeffery R. Thurlow
Attorney, Agent, or Firm—Stevens, Davis, Miller & Mosher

[57] ABSTRACT

A method for removing unreacted monomer (or monomers) from an ethylene homopolymer or a copolymer of ethylene and at least one monomer copolymerizable with ethylene during the course of pelletization by use of an extruder, said polymer having been formed by high-pressure polymerization by use of a radiation or a radical initiator, discharged from the reactor by way of a separator, and fed to said extruder to be pelletized, which method comprises injecting into said extruder 0.1 to 10% by weight (based on said polymer) of water or steam intermixing the polymer and the water or steam in the mixing section of the extruder screw, and subjecting the resulting mix to a subatmospheric pressure of 500 mmHg (absolute) or less in the venting zone provided in the extruder. This method permits efficient removal of the unreacted ethylene or the unreacted ethylene and comonomer contained in a homopolymer or copolymer of ethylene.

6 Claims, 1 Drawing Figure

U.S. Patent     June 13, 1978     4,094,942
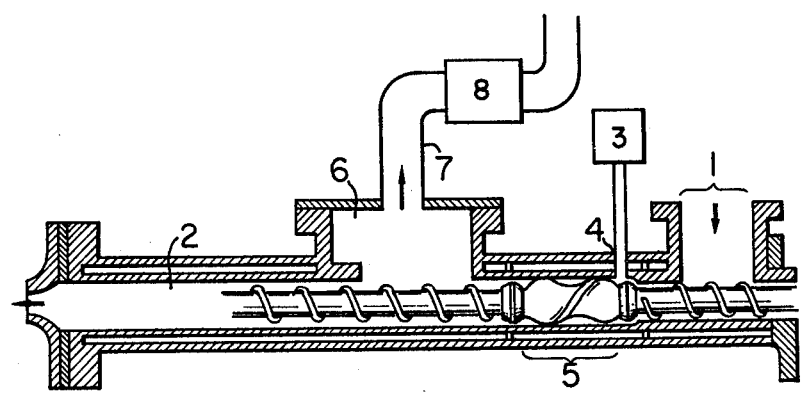

METHOD FOR REMOVING UNREACTED MONOMER

This invention relates to a method for removing the unreacted monomer remaining in the molten polymer during the course of pelletization by use of an extruder, said polymer having emerged from the known reaction step of high-pressure homopolymerization or copolymerization of ethylene by use of a radiation or a radical initiator, and fed to said extruder.

As well known, the ethylene homopolymer and copolymer formed by the high-pressure process and emerging from the reactor together with the unreacted monomer (monomers) have been sent successively to a high-pressure separator and a low-pressure separator, where most of the monomer (or monomers) have been removed, and then to an extruder to be pelletized.

In order to remove the unreacted monomer during the pelletization step, wherein an extruder is used, or from the pellets emerging from the pelletization step, the following two methods have conventionally been used: one consists in introducing air or an inert gas such as nitrogen into a hopper or other equipment containing the pellets, which are provided in the operation steps succeeding the pelletization step through the packaging of the pellets, to drive off the unreacted monomer liberated from the pellets; the other consists in providing a venting zone in the extruder for pelletization and evacuating the unreacted monomer from said zone by means of a vacuum pump, steam ejector, or the like.

In the case of the above-said first method, in order to lower equilibrium concentration of the unreacted monomer in the gas phase of a container such as a bag or tank lorry filled with the pellets to a level unhazardous for handling, which is one-fourth or less of the lower explosion limit (2.7% at ordinary pressure and temperature) in the case of ethylene for example, it is necessary to reduce the amount of unreacted ethylene contained in 1 kg of pellets to 15 ml or less. To achieve such a reduction in unreacted monomer content, it is necessary to introduce air or an inert gas for 20 to 40 hours into a heap of pellets in a hopper drier which must be installed. This method thus presents difficulties to the manufacturer in securing the space for installation of hopper driers and in increased investment, particularly when production is increased or a large-capacity plant is to be erected.

Further, in case other monomers than ethylene, such as, for example, vinyl acetate, are present, their removal by passing air or an inert gas alone is insufficient, resulting in reduced commercial value of the product owing to an uncomfortable odor.

In the case of the aforesaid second method, removal of the unreacted monomer by evacuation from the venting zone alone is insufficient; the merit of the method is found only in the reduction of time required for the subsequent removal by blowing air or an inert gas into a hopper drier filled with the pellets.

The present invention found a method for the removal of unreacted monomer from ethylene homo- or copolymer during the course of pelletization by use of an extruder, which method comprises injecting water or steam into said extruder, intermixing the polymer and the injected water or steam in the mixing section of the screw, then evacuating the volatiles from the venting zone, thus eliminating disadvantages of the conventional methods. The objectives of the present invention have been achieved on the basis of the above finding.

The accompanying drawing presents a process flow diagram to illustrate an embodiment of the present invention.

In the drawing, 1 represents a low-pressure separator, 2 an extruder, 3 a device for injecting water or steam, 4 an opening for injecting water or steam, 5 a mixing section for the polymer and water or steam, 6 a venting zone, 7 an exhaust pipe, and 8 an exhausting device.

According to this invention, there is provided a method for efficiently removing unreacted monomer from an ethylene homopolymer or an ethylene copolymer with at least one monomer copolymerizable with ethylene during the course of pelletization by use of an extruder, said polymer having been formed by well-known high-pressure polymerization, discharged from the reactor, and fed to said extruder, which method comprises injecting into said extruder 0.1 to 10% by weight (based on said polymer) of water or steam, intermixing the polymer with water or steam in the mixing section of the screw, and removing the volatiles from the venting zone provided in the extruder under application of a vacuum of 500 mmHg (absolute) or less, preferably 300 mmHg (absolute) or less.

The polymer, to which the present method is applicable, are ethylene homopolymers and copolymers of ethylene with at least one copolymerizable monomer, which are formed by polymerization at a pressure in the range from 500 to 4,000 atmospheres and a temperature in the range from 150° to 400° C. using a radiation or a radical initiator.

The monomers copolymerizable with ethylene are those having a terminal vinyl group and include $\alpha$-olefins such as, for example, propylene, 1-butene, styrene and $\alpha$-methylstyrene; acrylic acid, methacrylic acid, and their derivatives such as, for example, methyl, ethyl, propyl, butyl, and glycidyl esters of acrylic acid and methacrylic acid; vinyl carboxylates such as, for example, vinyl acetate and vinyl propionate; and other useful monomers including vinyl chloride and vinylidene chloride.

The water or steam to be injected into the extruder is preferably free from those impurities such as acidic substances which may have adverse influences on the quality of the polymer or corrosive action on the construction materials of the extruder; purified water is most desirable. The amount of water or steam to be injected is in the range from 0.1 to 10%, preferably from 0.5 to 5%, by weight based on the polymer, depending upon the type of extruder, temperature and melt index of the polymer.

An embodiment of the present invention is illustrated below in detail with reference to the accompanying drawing.

In accordance with the customary procedure, the reaction product of ethylene polymerization or copolymerization is transferred together with the unreacted monomer from the reactor through a high-pressure separator (not shown) to the low-pressure separator 1, where most of the unreacted monomer is removed. Thereafter, the reaction product (polymer) is pelletized by means of the extruder 2. Although the amounts of the unreacted monomers vary, depending on the pressure in low-pressure separator 1 and the kind and amount of comonomer used in the copolymerization, the unreacted ethylene content in 1 kg of polymer is 500 to 2,000 ml at normal state and as to the unreacted comonomer content, in the case of vinyl acetate for example, 0.05 to 0.5% by weight based on polymer of vinyl acetate is contained in the polymer.

The installation for removing the above-noted unreacted monomers consists essentially of the device 3 for injecting water or steam, the opening 4 for injecting water or steam into the nose portion of the mixing section 5 for intermixing the polymer and water or steam, as shown in the drawing the venting zone 6, the exhaust pipe 7, and the exhausting device 8. According to this invention, it is necessary that the opening 4 for injecting water or steam, the mixing section 5 for intermixing the polymer and water or steam, and the venting zone 6 be arranged in the order indicated from the polymer feeding end of the extruder 2.

The opening 4 for injecting water or steam can be provided at not only one point but also two or more points. The extruder employed in this invention may be either single-screw type or twin-screw type, though the latter is preferred.

According to the present invention, the following advantages can be expected.

Without use of a product hopper (hopper drier) for removing the unreacted monomer, the present method achieves a level of unreacted monomer removal comparable to that attained by the conventional method, wherein the unreacted monomer contained in the reaction product from ethylene homopolymerization or copolymerization is removed after pelletization by blowing air or an inert gas into a hopper drier filled with pellets. According to this invention, moreover, the time consumed in the conventional method after completion of the pelletization till the packaging or other post-treatment of pellets may be markedly reduced. These advantages are of great significance particularly when a large-capacity plant is to be erected. Further, the present invention provides a product of increased commercial value with respect to odor, because, besides ethylene, the unreacted comonomer is removed more thoroughly as compared with the conventional method. The unreacted monomer removed according to this invention can be easily recovered or disposed of by burning.

COMPARATIVE EXAMPLE 1

In order to show clearly the advantage of this invention, the results obtained in Comparative Example are given below. These results were obtained in an experiment conducted according to the conventional method for removing the unreacted monomer liberated from the pellets by blowing air through a heap of pellets.

Homopolymer of ethylene, i.e. polyethylene (melt index, 2.0; density, 0.924), formed by high-pressure polymerization was freed from most of the unreacted ethylene in a separator and fed to an unvented extruder (single-screw, L/D = 9.3; rate of delivery, 1,800 kg/hour; screw speed, 50 rpm; resin temperature at delivery end, 250° C.) to obtain pellets. In Table 1 is shown the change with time in residual amount of the unreacted ethylene contained in the pellets when air was continually blown at a rate of 2.0 m³/hour into a product hopper (hopper drier), 2.5 m³ in volume, filled with 1.2 tons of the pellets. The residual amount of unreacted ethylene contained in the pellets was determined in the following way: samples of pellets were collected when 0, 10, 20, 30, and 40 hours were elapsed after commencement of the air blowing into the hopper filled with the pellets. Each sample was melted at 120° C. to liberate completely the unreacted ethylene contained in the sample pellets, and the liberated ethylene was measured by gas-chromatography.

Table 1

| Time elapsed after pelletization, hours | Residual amount of unreacted ethylene in pellets ml/kg polyethylene |
|---|---|
| 0 | 700 |
| 10 | 110 |
| 20 | 45 |
| 30 | 19 |
| 40 | 12 |

As is apparent from Table 1, in order to reduce the residual amount of unreacted ethylene in the pellets below 15 ml/kg polyethylene, it was necessary to blow air through a heap of pellets for 40 hours.

COMPARATIVE EXAMPLE 2

In order to reveal the advantage of this invention more clearly, the residual amount of unreacted comonomer contained in the pellets of ethylene copolymer was determined immediately after pelletization. The polymerization, separation, and pelletization of the copolymer were carried out in a manner similar to that in comparative Example 1. The determination of the residual amount of unreacted comonomer was carried out in the following manner: 10 g of the pellets obtained by means of an unvented extruder was placed in an Erlenmeyer flask immediately after pelletization. Into the flask was added 15 ml of toluene and left standing at 30° C. for 144 hours to extract completely the unreacted comonomer. The amount of unreacted comonomer in the extract was measured by gas-chromatography. The results obtained were as shown in Table 2.

Table 2

| Comonomer*¹⁾ | Composition of copolymer,*²⁾ % by weight | Melt Index | Residual amount of unreacted comonomer in pellets, % by weight |
|---|---|---|---|
| VA | 30 | 20 | 0.2 |
| VA | 45 | 70 | 0.31 |
| MA | 20 | 10 | 0.06 |
| MA | 35 | 120 | 0.08 |
| MMA | 20 | 10 | 0.05 |
| MMA | 35 | 100 | 0.09 |

*¹⁾VA: Vinyl acetate
MA: Methyl acrylate
MMA: Methyl methacrylate
*²⁾Comonomer content of the copolymer

EXAMPLE 1

The extruder herein used was a twin-screw type (diameter of screw, 90 mm; L/D = 17). In accordance with the present invention, an opening was provided in the barrel to inject water or steam; a mixing section was provided along the screw axis in front of the said injection opening; in front of the mixing section, there was provided a venting zone, through which evacuation was effected by means of a vacuum pump (3,000 liters/min.).

An ethylene homopolymer, i.e. polyethylene (melt index, 2.0; density, 0.924), obtained by polymerization and separation in the same manner as in Comparative Example 1, was fed to the extruder and the pellets obtained were immediately collected as the sample for testing residual amount of the unreacted ethylene. Into the extruder barrel, was injected 0.1, 0.5, 5.0, or 10% by weight (based on polymer) of water or steam. Tests were run while evacuating by means of a vacuum pump or without evacuation. For comparison, tests were also run without injecting water or steam. The results obtained were as shown in Table 3.

As is apparent from Table 3, almost all of the unreacted ethylene contained in the molten polymer, i.e. molten polyethylene, may be removed efficiently by injecting 0.1% by weight or more (based on polymer) of water or steam and thereafter evacuating at a pressure of 500 mmHg (absolute) or less, preferably 300 mmHg (absolute) or less. It is thus possible to dispense with the conventional blowing of air through a heap of pellets and, hence, the additional hoppers, into which air or an inert gas is blown.

Table 3

| Run No. | Screw speed, r.p.m. | Delivery, kg/hour | Amount of water, % by weight[1] | Amount of steam, % by weight[1] | Vacuum, mmHg (absolute) | Residual amount of unreacted ethylene in pellets ml/kg polymer | Remark |
|---|---|---|---|---|---|---|---|
| 1 | 150 | 182 | 0 | 0 | —[2] | 670 | Comparative Example |
| 2 | 150 | 178 | 0 | 0 | 150 | 80 | " |
| 3 | 150 | 185 | 0.1 | 0 | 250 | 16 | " |
| 4 | 150 | 177 | 0.5 | 0 | 275 | 9 | " |
| 5 | 150 | 175 | 1.5 | 0 | 300 | 8 | " |
| 6 | 150 | 176 | 1.5 | 0 | 490 | 12 | " |
| 7 | 150 | 181 | 5.0 | 0 | 290 | 8 | " |
| 8 | 150 | 173 | 10.0 | 0 | 305 | 8 | " |
| 9 | 150 | 182 | 0 | 1.5 | 280 | 10 | " |
| 10 | 150 | 175 | 0 | 5.0 | 310 | 6 | " |

[1]% by weight based on polymer
[2]Without evacuation

EXAMPLE 2

Ethylene copolymers formed by polymerization and separation in the same manner as in Comparative Example 2 were fed to the same extruder as used in Example 1 and the pellets obtained were immediately tested for the residual amount of the unreacted comonomer. The results obtained were as shown in Table 4.

As is apparent from Table 4, the unreacted comonomer may be removed efficiently by injecting water or steam into the molten copolymer and thereafter evacuating in accordance with this invention.

What is claimed is:

1. A method for removing unreacted monomer or monomers from a molten ethylene homopolymer or a copolymer of ethylene with at least one monomer copolymerizable with ethylene during the course of pelletization by use of an extruder, said polymer having been formed by high-pressure polymerization by use of a radiation or a radical initiator, discharged from the reactor by way of a separator, and fed to said extruder to be pelletized, which method comprises injecting into a nose portion of a mixing section of said extruder 0.1 to 10% by weight, based on said polymer of water or steam, intermixing the polymer and the water or steam in the mixing section of the extruder screw, and removing the unreacted monomer and water or steam contained in the mix from the venting zone provided after the mixing section in the extruder under application of a vacuum of 500 mmHg absolute or less.

2. A method according to claim 1, wherein 0.5 to 5% by weight (based on polymer) of the water or steam is injected.

3. A method according to claim 1, wherein the vacuum applied is 300 mmHg (absolute) or less.

4. A method according to claim 1, wherein the water is purified water.

5. A method according to claim 1, wherein the monomer copolymerizable with ethylene is an α-olefin, Table 4

| Run No. | Comonomer[1] | Composition of copolymer, % by weight[2] | M.I.[3] | Screw speed, r.p.m. | Delivery, kg/hour | Amount of water, % by weight[4] | Amount of steam, % by weight[4] | Vacuum, mmHg (abs.) | Residual amount of unreacted comonomer pellets, % by weight based on copolymer | Remark |
|---|---|---|---|---|---|---|---|---|---|---|
| 1 | VA | 45 | 70 | 150 | 170 | 0 | 0 | —[5] | 0.28 | Comp. Example |
| 2 | VA | 45 | 70 | 150 | 165 | 0 | 0 | 200 | 0.07 | " |
| 3 | VA | 45 | 70 | 150 | 160 | 2.0 | 0 | 230 | 0.01 | Example |
| 4 | VA | 45 | 70 | 150 | 162 | 0 | 2.0 | 480 | 0.02 | " |
| 5 | VA | 30 | 20 | 150 | 175 | 0 | 0 | 230 | 0.05 | Comp. Example |
| 6 | VA | 30 | 20 | 150 | 171 | 2.0 | 0 | 250 | 0.01 | Example |
| 7 | MA | 35 | 120 | 150 | 152 | 0 | 0 | —[5] | 0.08 | Comp. Example |
| 8 | MA | 35 | 120 | 150 | 160 | 0 | 0 | 220 | 0.02 | " |
| 9 | MA | 35 | 120 | 150 | 150 | 2.0 | 0 | 220 | 0.005 | Example |
| 10 | MMA | 35 | 100 | 150 | 172 | 0 | 0 | —[5] | 0.09 | Comp. Example |
| 11 | MMA | 35 | 100 | 150 | 168 | 0 | 0 | 270 | 0.04 | " |
| 12 | MMA | 35 | 100 | 150 | 165 | 2.0 | 0 | 280 | 0.01 | Example |

[1]VA: Vinyl acetate MA: methyl acrylate MMA: methyl methacrylate.
[2]Comonomer content of the copolymer.
[3]Melt index.
[4]% by weight based on copolymer.
[5]Without use of a vacuum pump.

acrylic acid, methacrylic acid, a derivative of acrylic acid or methacrylic acid, a vinyl carboxylate, vinyl chloride, or vinylidene chloride.

6. A method according to claim 5, wherein the monomer copolymerizable with ethylene is propylene, 1-butene, styrene, α-methylstyrene, acrylic acid, methacrylic acid; methyl, ethyl, propyl, butyl, or glycidyl ester of acrylic or methacrylic acid; vinyl acetate, vinyl propionate, vinyl chloride, or vinylidene chloride.

* * * * *